United States Patent [19]
Mayer et al.

[11] 4,248,819
[45] Feb. 3, 1981

[54] PROCESS FOR IMPROVING THE PROCESSING PROPERTIES OF POWDERY POLYOLEFINS

[75] Inventors: Manfred Mayer, Niedernhausen; Gerhard Nöltner; Rudolf Nowack, both of Frankfurt am Main; Wolfgang Strobel, Hofheim am Taunus, all of Fed. Rep. of Germany

[73] Assignee: Hoechst Aktiengesellschaft, Frankfurt am Main, Fed. Rep. of Germany

[21] Appl. No.: 952,662

[22] Filed: Oct. 19, 1978

[30] Foreign Application Priority Data

Oct. 21, 1977 [DE] Fed. Rep. of Germany ....... 2747204

[51] Int. Cl.$^3$ ............................................. B29J 5/00
[52] U.S. Cl. .................................. 264/109; 264/118; 264/126; 264/176 R
[58] Field of Search .................. 264/500, 570, 176 R, 264/331, 140, 175, 118, 126, 109, 138

[56] References Cited

U.S. PATENT DOCUMENTS

| | | | |
|---|---|---|---|
| 3,152,201 | 10/1964 | Kumnick | 264/140 |
| 3,339,850 | 9/1967 | Kehr et al. | 264/118 |
| 3,617,590 | 11/1971 | Neukomm | 264/118 |
| 3,663,674 | 5/1972 | Holiday | 264/118 |
| 3,733,383 | 5/1973 | Bunney et al. | 264/331 |
| 3,767,748 | 10/1973 | Rosette | 264/500 |
| 3,803,286 | 4/1974 | Makatsuka et al. | 264/331 |
| 3,822,177 | 7/1974 | Moked | 264/126 |
| 3,988,401 | 10/1976 | Kasting et al. | 264/175 |
| 4,014,965 | 3/1977 | Stube et al. | 264/126 |

FOREIGN PATENT DOCUMENTS 110381 4/1940 Australia .................................. 264/331

Primary Examiner—Jay H. Woo
Attorney, Agent, or Firm—Curtis, Morris & Safford

[57] ABSTRACT

The invention relates to a process for improving the processing properties of powdery polyolefins. It is endeavored by this process to obtain a polyolefin powder which can be processed on screw extruders to an almost bubble-free product.

The polyolefin powder is heated to a temperature of between 40° C. and its melting point and introduced into a gap between two gap-forming elements. In this gap, the powder is compressed with a pressure of from 0.1 to 10 t per cm of gap length, and the powder so compressed is then comminuted.

13 Claims, No Drawings

PROCESS FOR IMPROVING THE PROCESSING PROPERTIES OF POWDERY POLYOLEFINS

The present invention relates to a process for improving the processing properties of powdery polyolefins such as polyethylene, polypropylene and their mixtures.

When processing powdery polyolefins on heavy duty single screw extruders, air sucked into the plastics mass appears in the form of undesired bubbles in the final product. The formation of bubbles is prevented by using granules instead of powder, which after melting at temperatures of over 190° C., had to be prepared with the aid of an extruder. This type of treatment of the polyolefin powder for improving its processing properties is very expensive and involves an additional, undesired thermical load.

Thus, it was an object of the present invention to find a process of the above-described type which permits in simple and very economical manner to positively influence the processing properties of polyolefin powder to permit processing on heavy duty single screw extruders to an almost bubble-free product.

This object was achieved by a process which is characterized by heating the polyolefin powder to a temperature of between 40° C. and its melting point, preferably to a temperature of between 80° C. and 95° C., then introducing the powder into the gap of two gap-forming elements, compressing the powder therein with pressures of from 0.1 to 10 t/cm. of gap length, preferably from 0.8 to 2 t/cm of gap length and finally comminuting the compressed material.

The powder may be compressed into a band or into granules, depending on whether the surface of the gap-forming elements is smooth or sieve-like.

Gap-forming elements are the rolls of roll pairs and pairs of rolls and a flat surface.

During compression, the heated polyolefin powder is subjected to a kind of plastic moulding, which causes the particles submitted to this treatment to change their properties drastically. Thus, the pore volume of the powder can be reduced to zero, while the permeability to air is increased to such a high degree that the air still enclosed in the powder can easily escape during extrusion in the extruder. Furthermore, the powder density is increased and the powder can be processed practically bubble-free with high economical yield on heavy duty single screw extruders.

It has been found that these changes of the properties can also be obtained with rolls having radial borings, through which the material is pressed into the gap, so that cylinder-shaped granules are formed.

Compression to achieve obtention of the desired properties may also be effected using a machine having a flat plate with borings and on which one or several parallely arranged rolls press the powder into the gap formed between the rolls and the plate and force it through the borings. In this case, the size of the borings is preferably between 1.5 and 6 mm.

The powder compressed in the above-described manner is then comminuted in a hammer mill, a roll mill, or a similar comminuting machine, to a grain size which is comparable to that of the starting material.

The process of the invention shows particular advantages in direct in-line operation. In this process, in the last step, the powder leaving the drier with a temperature of 90° C. to 100° C. is directly compressed, which is a particularly economical, energy-saving operation.

A polyolefin powder treated according to the process of the invention permits an increase of the output of heavy duty single screw extruders by up to 30%.

The invention is illustrated in more detail by the following examples.

EXAMPLE 1

Polyethylene powder having an average grain size of 220 μm, a pore volume of 4.7 cm$^3$/100 g, an air permeability of $2.1 \cdot 10^{-3}$ cm$^4$/dynsec and a powder density of 440 g/l was brought to a temperature of 95° C. in a heated fluidized bed. The powder so heated was then conveyed under pressure by a screw conveyor into the gap formed by two smooth and unheated rolls which rotated in opposite direction and had a diameter of 650 mm and a width of 200 mm. The pressure applied by the rolls was about 0.9 t/cm of roll length. The powder so compressed was then taken off as a band from the rolls which rotated with a speed of 9.5 rpm. It was then broken down on a rough mill and comminuted to an average grain size of 290 μm on a hammer mill.

The powder so treated had a pore volume of 0 cm$^3$/100 g, a permeability to air of $5.75 \cdot 10^{-3}$ cm$^4$/dynsec and a powder density of 460 g/l. Extrusion tests showed that the product extruded from a powder treated in such a manner had only 17 bubbles as compared to about 1500 bubbles found in the untreated powder material.

EXAMPLE 2

Polyethylene powder having an average grain size of 220 μm, a pore volume of 4.7 cm$^3$/100 g, a permeability to air of $2.1 \cdot 10^{-3}$ cm$^4$/dynsec and a powder density of 440 g/l was heated to a temperature of 75° C. during passage through a tunnel provided with heating tubes. The powder so heated was then introduced into a machine which consisted, in a manner similar to that of an edge runner mixer, of a flat circular plate having a diameter of 450 mm, on which were rolling four rolls the axes of which were parallel to the plate. The rolls running over the plate were pressed against the plate with a force of 1.6 t/cm. The plate had 250 borings through which the powder was pressed. The diameter of the rolls was 200 mm, their length was 160 mm.

The cylindrical granules so obtained were comminuted on a sieving machine to an average grain size of 350 μm. The material so treated showed a pore volume of 0 cm$^3$/100 g, a permeability to air of $3.9 \cdot 10^{-3}$ cm$^4$/dynsec and a powder density of 450 g/l. In an extrusion test, the product prepared from a powder treated in such a manner had only 18 bubbles in contrast to about 1500 bubbles found in an untreated product. The values for the pore volume, the permeability to air and the number of bubbles, indicated in the above examples, were determined in the following manner:

Number of bubbles: For counting the number of bubbles, a tubular film of the material was extruded from a single screw extruder and a square piece of 100 cm$^2$ was cut out from the film. The number of bubbles appearing in this square was recorded.

Pore volume: The pore volume was determined with paraffin oil the boiling point of which was between 130° C. and 170° C. 100 g of the powder was introduced into a vessel a capillary was placed thereon and the whole system was floated with paraffin oil and stirred until the formation of bubbles ceased. The amount of gas that had been liberated was measured. In this manner, the amount of the pore volume was determined in cm³ of air per 100 g of powder.

Permeability to air: 100 ml of polyolefin powder was put into a glass cylinder which had an internal diameter of 3 cm and a glass frit bottom. 4 Nl/h of air was sucked through the powder from top to bottom. The pressure difference between the upper and lower edge of the powder was measured. The permeability to air was then determined in cm⁴/dynsec from the values recorded. Powders that had a permeability to air of $3.5 \cdot 10^{-3}$ cm⁴/dynsec and higher showed very good degassing results on single screw extruders.

We claim:

1. A process for improving the processing properties of a powdered polyolefin comprising the steps of:
    heating the powdered polyolefin to a temperature between 40° C. and the melting point of the powdered polyolefin;
    introducing the heated powdered polyolefin into a gap of two gap forming elements;
    compressing the heated powdered polyolefin in the gap with a pressure of from 0.1 to 10 t/cm of gap length; and
    comminuting the compressed powdered polyolefin to form a powder.

2. A process for improving the processing properties of a powdered polyolefin to reduce the formation of bubbles in a product extruded from the powdered polyolefin which comprises the steps of:
    heating the powdered polyolefin to a temperature between 40° C. and the melting point of the powdered polyolefin;
    introducing the heated powdered polyolefin in a gap between two gap forming elements;
    compressing the heated powdered polyolefin in the gap at a pressure of from 0.1 to 10 t/cm of gap length until the pore volume of the heated powdered polyolefin is reduced to zero; and
    comminuting the compressed powdered polyolefin to form a powder.

3. A process for improving the processing properties of a powdered polyolefin to reduce the formation of bubbles in a product extruded from the powdered polyolefin powder which comprises the steps of:
    heating the powdered polyolefin to a temperature between 40° C. and the melting point of the powdered polyolefin;
    introducing the heated powdered polyolefin in a gap between a surface and a roll means for compressing the powdered polyolefin introduced in said gap against said surface;
    compressing the heated powdered polyolefin in the gap with a pressure of from 0.1 to 10 t/cm of gap length; and
    comminuting the compressed powdered polyolefin to form a powder.

4. A process for improving the processing properties of a powdered polyolefin to reduce the formation of bubbles in a product formed from the polyolefin powder, which comprises the steps of:
    heating the powdered polyolefin to a temperature between 40° C. and the melting point of the powdered polyolefin;
    conveying said heated powdered polyolefin into a gap formed between two rolls;
    compressing said heated powdered polyolefin in the gap between said two rolls with a pressure of from 0.1 to 10 t/cm of gap length until the pore volume of said compressed powdered polyolefin is zero; and
    comminuting said compressed powdered polyolefin to form a powder.

5. The process, as claimed in claim 1, 2, 3 or 4, wherein in said compressing step, the heated powdered polyolefin is compressed to form a band.

6. The process, as claimed in claim 1, 2, 3 or 4, wherein in said compressing step, the heated powdered polyolefin is compressed to form granules.

7. The process, as claimed in claim 1, 2, 3 or 4, wherein in said introducing step, the heated powdered polyolefin is conveyed by a screw conveyor into the gap.

8. The process, as claimed in claim 1, 2, 3 or 4, wherein in said compressing step, the pressure is from 0.8 to 2 t/cm of gap length.

9. The process, as claimed in claim 1, 2, 3 or 4, wherein in said heating step, the polyolefin powder is heated to a temperature of between 80° C. and 95° C.

10. The process, as claimed in claim 1, 2, 3 or 4, wherein said polyolefin is polyethylene.

11. The process, as claimed in claim 1, wherein said introducing and compressing step include:
    introducing the heated powdered polyolefin in a gap formed between a pair of compression rolls; and
    compressing said heated powdered polyolefin in the gap between said pair of rolls with a pressure of from 0.1 to 10 t/cm of gap length.

12. The process, as claimed in claim 3, wherein said introducing and compressing steps include:
    introducing the heated powdered polyolefin in a gap between a roll and flat plate provided with borings therethrough; said borings each having a diameter of between 1.5 and 6 mm.;
    compressing said heating powdered polyolefin in the gap with a pressure of from 0.1 to 10 t/cm and forcing said heated powdered polyolefin through said borings in said plate.

13. The process as claimed in claim 1, 2, 3 or 4, which further comprises the step of:
    extruding the comminuted polyolefin powder to form a product.

* * * * *